(12) United States Patent
Uchida

(10) Patent No.: US 9,200,179 B2
(45) Date of Patent: Dec. 1, 2015

(54) POLYURETHANE DISPERSION AND METHOD FOR PRODUCING THE SAME

(75) Inventor: Takashi Uchida, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 280 days.

(21) Appl. No.: 13/258,302

(22) PCT Filed: Mar. 10, 2010

(86) PCT No.: PCT/JP2010/054051
§ 371 (c)(1),
(2), (4) Date: Sep. 21, 2011

(87) PCT Pub. No.: WO2010/110076
PCT Pub. Date: Sep. 30, 2010

(65) Prior Publication Data
US 2012/0016075 A1     Jan. 19, 2012

(30) Foreign Application Priority Data
Mar. 27, 2009  (JP) ................................ 2009-078625

(51) Int. Cl.
| | |
|---|---|
| *B05D 3/00* | (2006.01) |
| *B29C 65/00* | (2006.01) |
| *B31B 1/62* | (2006.01) |
| *B32B 37/12* | (2006.01) |
| *C08G 18/08* | (2006.01) |
| *C08K 3/20* | (2006.01) |
| *C08L 75/00* | (2006.01) |
| *C09J 175/04* | (2006.01) |
| *C09D 175/04* | (2006.01) |
| *B29C 65/48* | (2006.01) |
| *C08G 18/12* | (2006.01) |
| *C08G 18/34* | (2006.01) |
| *C08G 18/42* | (2006.01) |
| *C08G 18/44* | (2006.01) |
| *C08G 18/48* | (2006.01) |
| *C08G 18/72* | (2006.01) |
| *C08G 18/75* | (2006.01) |

(52) U.S. Cl.
CPC ............ *C09D 175/04* (2013.01); *B29C 65/481* (2013.01); *B31B 1/62* (2013.01); *B32B 37/12* (2013.01); *C08G 18/0823* (2013.01); *C08G 18/12* (2013.01); *C08G 18/348* (2013.01); *C08G 18/4213* (2013.01); *C08G 18/4238* (2013.01); *C08G 18/44* (2013.01); *C08G 18/4854* (2013.01); *C08G 18/722* (2013.01); *C08G 18/755* (2013.01); *C08G 18/757* (2013.01); *C08G 18/758* (2013.01); *B32B 2037/1276* (2013.01); *C08G 2170/80* (2013.01)

(58) Field of Classification Search
CPC ........ B29C 65/481; B31B 1/62; B32B 37/12; B32B 2037/1276; C08G 18/0823; C08G 18/12; C08G 18/302; C08G 18/348; C08G 18/4213; C08G 18/4238; C08G 18/44; C08G 18/4854; C08G 18/722; C08G 18/755; C08G 18/757; C08G 18/758; C08G 2170/80; C09D 175/04
USPC ........... 524/591, 839, 840; 156/60, 99, 330.9, 156/331.7; 427/372.2, 385.5
See application file for complete search history.

(56) References Cited

U.S. PATENT DOCUMENTS

| | | |
|---|---|---|
| 4,661,542 A | 4/1987 | Gilch et al. |
| 2005/0197480 A1 | 9/2005 | Temple et al. |
| 2005/0197481 A1 | 9/2005 | Temple et al. |
| 2009/0036630 A1 | 2/2009 | Sasano et al. |

FOREIGN PATENT DOCUMENTS

| | | |
|---|---|---|
| JP | 61-185578 A | 8/1986 |
| JP | 08-113623 A | 5/1996 |
| JP | 10-060373 A | 3/1998 |
| JP | 11-216793 | 8/1999 |
| JP | 2001-010003 | 1/2001 |
| JP | 2001-277438 | 10/2001 |
| JP | 2004-155186 | 6/2004 |
| JP | 2004-238403 A | 8/2004 |
| JP | 2005-178312 | 7/2005 |
| JP | 2006-193657 A | 7/2006 |
| JP | 2007-176054 | 7/2007 |
| JP | 2007-177171 A | 7/2007 |
| JP | 2007-284532 A | 11/2007 |
| WO | WO 2008/077118 A2 | 6/2008 |

OTHER PUBLICATIONS

International Search Report dated Jun. 22, 2010 issued in International Application No. PCT/JP2010/054051.
Japanese Notice of Allowance in Application No. 2011-505971 dated Feb. 12, 2014.
Japanese Office Action in Application No. 2011-505971 dated Dec. 17, 2013.

*Primary Examiner* — Patrick Niland
(74) *Attorney, Agent, or Firm* — Foley & Lardner LLP

(57) ABSTRACT

A polyurethane dispersion is obtained by aqueously dispersing an aqueous polyurethane resin obtained by reaction of an isocyanate group-terminated urethane prepolymer with a chain extender. The isocyanate group-terminated urethane prepolymer contains an adhesive urethane prepolymer for imparting adhesion and a gas-barrier urethane prepolymer for imparting gas barrier properties.

12 Claims, No Drawings

POLYURETHANE DISPERSION AND METHOD FOR PRODUCING THE SAME

TECHNICAL FIELD

The present invention relates to polyurethane dispersion and method for producing the same. More particularly, the present invention relates to a polyurethane dispersion used in an anchor coat agent and a method for producing the polyurethane dispersion.

BACKGROUND ART

Heretofore, gas barrier films have widely been known to be produced by treating a surface of a base film with an anchor coat agent, and then depositing metal and/or metal oxide thereon.

As such gas barrier films, there has been proposed a gas barrier film obtained by providing a first overlayer based on a polyurethane polymer on at least one side of a base film made of thermoplastic resin, and further forming a second overlayer made of at least one kind of metal or metal oxide on the first overlayered layer (see, for example, the following Patent Document 1, etc.).

CITATION LIST

Patent Literature

Patent Document 1: Japanese Unexamined Patent Publication No. 2001-10003

DISCLOSURE OF THE INVENTION

Problems to be Solved

The anchor coat agent used for gas barrier films can improve adhesion between a base film and a deposited film. However, it does not have sufficient gas barrier properties. Accordingly, development of an anchor coat agent having both adhesion and gas barrier properties with good balance is desired.

It is an object of the present invention to provide a polyurethane dispersion having both adhesion and gas barrier properties with good balance, and a method for producing the polyurethane dispersion.

Means for Solving the Problem

The polyurethane dispersion of the present invention is obtained by aqueously dispersing an aqueous polyurethane resin obtained by reaction of an isocyanate group-terminated urethane prepolymer with a chain extender, in which the isocyanate group-terminated urethane prepolymer contains an adhesive urethane prepolymer for imparting adhesion and a gas-barrier urethane prepolymer for imparting gas barrier properties.

In the polyurethane dispersion of the present invention, it is preferable that the adhesive urethane prepolymer is obtained by reaction of a polyisocyanate component and a polyol component containing a high-molecular-weight polyol, and the gas-barrier urethane prepolymer is obtained by reaction of a polyisocyanate component and a polyol component not containing a high-molecular-weight polyol but containing a low-molecular-weight polyol.

In the polyurethane dispersion of the present invention, it is preferable that the aqueous polyurethane resin contains an adhesive-gas barrier resin obtained by reaction of a mixture of the adhesive urethane prepolymer and the gas-barrier urethane prepolymer with a chain extender.

In the polyurethane dispersion of the present invention, it is preferable that the aqueous polyurethane resin contains an adhesive resin obtained by reaction of the adhesive urethane prepolymer with the chain extender; and a gas barrier resin obtained by reaction of the gas-barrier urethane prepolymer with the chain extender.

In the polyurethane dispersion of the present invention, it is preferable that the polyol component for obtaining the adhesive urethane prepolymer contains a polyester polyol and a polyhydroxyalkanoic acid. Further, it is preferable that the polyol component for obtaining the gas-barrier urethane prepolymer consists of a low-molecular-weight polyol including a polyhydroxyalkanoic acid, and the polyester polyol has a ring structure in its molecule. Even further, it is preferable that the polyester polyol is obtained by reaction of a polybasic acid and a polyhydric alcohol, and the polybasic acid is at least one polybasic acid selected from the group consisting of terephthalic acid, isophthalic acid, and orthophthalic acid.

In the polyurethane dispersion of the present invention, it is preferable that the polyisocyanate component contains an aralkyl diisocyanate and/or an alicyclic diisocyanate, and the low-molecular-weight polyol contains an alkane polyol having 2 to 6 carbon atoms and/or a polyoxyalkylene glycol having 2 to 6 carbon atoms, and a polyhydroxyalkanoic acid. Further, it is preferable that the polyisocyanate component contains xylylene diisocyanate and/or hydrogenated xylylene diisocyanate.

It is preferable that the polyurethane dispersion of the present invention is used as an anchor coat agent for laminating and adhesively bonding an inorganic deposited film on at least one side of a thermoplastic resin film.

In the polyurethane dispersion of the present invention, it is preferable that the thermoplastic resin film is a polyester film.

The method for producing a polyurethane dispersion according to the present invention includes the steps of allowing a polyisocyanate component and a polyol component containing a high-molecular-weight polyol to react to thereby prepare an adhesive urethane prepolymer having an isocyanate group in its molecular terminal, for imparting adhesion; allowing a polyisocyanate component and a polyol component not containing a high-molecular-weight polyol but containing a low-molecular-weight polyol to react to thereby prepare a gas-barrier urethane prepolymer having an isocyanate group in its molecular terminal, for imparting gas barrier properties; and allowing a mixture of the adhesive urethane prepolymer and the gas-barrier urethane prepolymer to react with a chain extender in water to thereby obtain a dispersion of an adhesive-gas barrier resin.

Effect of the Invention

The polyurethane dispersion of the present invention has both adhesion and gas barrier properties, and is suitably used as an anchor coat agent for laminating and adhesively bonding an inorganic deposited film to at least one side of a film made of thermoplastic resin, such as a polyester film, in a gas barrier laminated film.

The method for producing the polyurethane dispersion according to the present invention can reliably produce the polyurethane dispersion of the present invention.

EMBODIMENT OF THE INVENTION

The polyurethane dispersion of the present invention can be obtained by aqueously dispersing an aqueous polyurethane resin, and the aqueous polyurethane resin can be obtained by reaction of an isocyanate group-terminated urethane prepolymer with a chain extender.

According to the present invention, the isocyanate group-terminated urethane prepolymer contains an adhesive urethane prepolymer and a gas-barrier urethane prepolymer.

The adhesive urethane prepolymer is an isocyanate group-terminated urethane prepolymer for imparting adhesion to the polyurethane dispersion of the present invention, and can be obtained by allowing a polyisocyanate component and a polyol component to react at such a ratio that the amount of the isocyanate group of the polyisocyanate component exceeds that of the hydroxyl group of the polyol component.

Hereinafter, the polyisocyanate component used for synthesis of the adhesive urethane prepolymer and the polyisocyanate component used for synthesis of the gas-barrier urethane prepolymer are distinguished as follows: The polyisocyanate component used for synthesis of the adhesive urethane prepolymer is referred to as an adhesive polyisocyanate component; and the polyisocyanate component used for synthesis of the gas-barrier urethane prepolymer is referred to as a gas-barrier polyisocyanate component (to be described later).

Likewise, the polyol component used for synthesis of the adhesive urethane prepolymer and the polyol component used for synthesis of the gas-barrier urethane prepolymer are distinguished as follows: The polyol component used for synthesis of the adhesive urethane prepolymer is referred to as an adhesive polyol component; and the polyol component used for synthesis of the gas-barrier urethane prepolymer is referred to as a gas-barrier polyol component (to be described later).

Examples of the adhesive polyisocyanate component include an aromatic polyisocyanate, an aralkyl polyisocyanate, an alicyclic polyisocyanate, and an aliphatic polyisocyanate.

Examples of the aromatic polyisocyanate include aromatic diisocyanates such as 4,4'-, 2,4'- or 2,2'-diphenylmethane diisocyanate or mixtures thereof (MDI), 2,4- or 2,6-tolylene diisocyanate or mixtures thereof (TDI), 4,4'-toluidine diisocyanate (TODI), 1,5-naphthalene diisocyanate (NDI), m- or p-phenylene diisocyanate or mixtures thereof, 4,4'-diphenyl diisocyanate, and 4,4'-diphenyletherdiisocyanate.

Examples of the aralkyl polyisocyanate include aralkyl diisocyanates such as 1,3- or 1,4-xylylene diisocyanate or mixtures thereof (XDI), 1,3- or 1,4-tetramethylxylylene diisocyanate or mixtures thereof (TMXDI), and ω,ω'-diisocyanato-1,4-diethylbenzene.

Examples of the alicyclic polyisocyanate include alicyclic diisocyanates such as 3-isocyanatomethyl-3,5,5-trimethylcyclohexyl isocyanate (isophorone diisocyanate, IPDI), 4,4'-, 2,4'- or 2,2'-dicyclohexylmethane diisocyanate or mixtures thereof ($H_{12}$MDI), 1,3- or 1,4-bis(isocyanatomethyl)cyclohexane or mixtures thereof (hydrogenated xylylene diisocyanate, $H_6$XDI), bis(isocyanatomethyl)norbornane (NBDI), 1,3-cyclopentene diisocyanate, 1,4-cyclohexane diisocyanate, 1,3-cyclohexane diisocyanate, methyl-2,4-cyclohexane diisocyanate, and methyl-2,6-cyclohexane diisocyanate.

Examples of the aliphatic polyisocyanate include aliphatic diisocyanates such as hexamethylene diisocyanate (HDI), trimethylene diisocyanate, tetramethylene diisocyanate, pentamethylene diisocyanate, 1,2-, 2,3- or 1,3-butylene diisocyanate, and 2,4,4- or 2,2,4-trimethyl hexamethylene diisocyanate.

Further examples of the adhesive polyisocyanate component include multimers (e.g., dimers, trimers, pentamers, heptamers, etc.) of the above-mentioned adhesive polyisocyanate components, a biuret-modified adhesive polyisocyanate component produced by reaction of the above-mentioned adhesive polyisocyanate component or a multimer thereof with water, an allophanate-modified adhesive polyisocyanate component produced by reaction of the above-mentioned adhesive polyisocyanate component or a multimer thereof with monol or polyhydric alcohol (to be described later), an oxadiazinetrione-modified adhesive polyisocyanate component produced by reaction of the above-mentioned adhesive polyisocyanate component or a multimer thereof with carbon dioxide, and further, a polyol-modified adhesive polyisocyanate component produced by reaction of the above-mentioned adhesive polyisocyanate component or a multimer thereof with a low-molecular-weight polyol (to be described later).

These adhesive polyisocyanate components can be used alone or in combination of two or more kinds.

As the adhesive polyisocyanate component, an aralkyl polyisocyanate and an alicyclic polyisocyanate are preferable, and XDI, IPDI, $H_{12}$MDI, and $H_6$XDI are more preferable.

Examples of the adhesive polyol component include a high-molecular-weight polyol (hereinafter referred to as a macropolyol) and a low-molecular-weight polyol.

The macropolyol is a polyol having a number average molecular weight of 400 to 10000, and examples thereof include polyester polyol, polyether polyol, polycarbonate polyol, polyurethane polyol, acrylic polyol, epoxy polyol, natural oil polyol, silicone polyol, fluorine polyol, and polyolefin polyol.

The polyester polyol can be obtained by a known esterification reaction, i.e., a condensation reaction between a polybasic acid and a polyhydric alcohol, or a transesterification reaction between an alkyl ester of a polybasic acid and a polyhydric alcohol.

Examples of the polybasic acid or its alkyl ester include aliphatic dicarboxylic acid such as succinic acid, adipic acid, azelaic acid, sebacic acid, dodecanoic diacid, and dimeric acid; alicyclic dicarboxylic acid such as hexahydrophthalic acid and tetrahydrophthalic acid; and aromatic dicarboxylic acid such as isophthalic acid, terephthalic acid, orthophthalic acid, and naphthalene dicarboxylic acid; or dialkyl esters thereof (e.g., alkyl esters having 1 to 6 carbon atoms) or acid anhydrides thereof, or mixtures thereof.

As the polybasic acid, an aromatic dicarboxylic acid such as isophthalic acid, terephthalic acid, and orthophthalic acid is preferable, or combination use of an aromatic dicarboxylic acid and an aliphatic dicarboxylic acid is more preferable.

Examples of the polyhydric alcohol include diols such as ethylene glycol, propylene glycol, 1,4-butylene glycol, 1,3-butylene glycol, 1,2-butylene glycol, 2-methyl-1,3-propanediol, 1,5-pentanediol, neopentyl glycol, 3-methyl-1,5-pentanediol, 2,4-diethyl-1,5-pentanediol, 1,6-hexanediol, alkane (of 7 to 22 carbon atoms) diol, 2,6-dimethyl-1-octene-3,8-diol, cyclohexane dimethanol, hydrogenated bisphenol A, 1,4-dihydroxy-2-butene, bishydroxyethoxy benzene, xylene glycol, bishydroxyethylene terephthalate, alkylene oxide adducts of bisphenol A or hydrogenated bisphenol A, diethylene glycol, trioxyethylene glycol, tetraoxyethylene glycol, pentaoxyethylene glycol, hexaoxyethylene glycol, dipropylene glycol, trioxypropylene glycol, tetraoxypropylene glycol, pentaoxypropylene glycol, and hexaoxypropylene glycol; triols such as glycerin, 2-methyl-2-hydroxymethyl-1,3-propanediol, 2,4-dihydroxy-3-hydroxymethylpentane, 1,2,6-hexanetriol, trimethylolpropane, 2,2-bis(hydroxymethyl)-3-butanol, and other aliphatic triols (of 8 to 24 carbon atoms); and polyols having four or more hydroxyl groups such as tetramethylolmethane, D-sorbitol, xylitol, D-mannitol, and D-mannite, or mixtures thereof.

Further examples of the polyhydric alcohol include polyhydroxy compounds containing an anionic group. Examples of the anionic group include a carboxyl group, a sulfonyl group, a phosphoric acid group, and a betaine-structure-containing group such as sulfobetaine. Of these, a carboxyl group is preferable. Examples of such polyhydroxy compound containing a carboxyl group as an anionic group include polyhydroxyalkanoic acids such as dimethylolacetic acid, dimethylollactic acid, dimethylolpropionic acid, and dimethylolbutanoic acid.

As the polyhydric alcohol, a diol is preferable.

Preferred examples of the polyester polyol include a polyester polyol having a ring structure in its molecule, such as a polyester polyol obtained by reaction of a polybasic acid including aromatic dicarboxylic acid and aliphatic dicarboxylic acid with a polyhydric alcohol including a diol.

The polyether polyol can be obtained by, for example, ring-opening homopolymerization or ring-opening copolymerization of alkylene oxide (e.g., alkylene oxide having 2 to 5 carbon atoms such as ethylene oxide, propylene oxide, butylene oxide, tetrahydrofuran, 3-methyltetrahydrofuran, oxetane compound, etc.) using a low-molecular-weight polyol (to be described later) as an initiator. Specific examples thereof include polyoxyethylene glycol, polyoxypropylene glycol, polyoxyethylene-propylene copolymer, polyoxytetramethylene glycol (polytetramethylene ether glycol).

The polycarbonate polyol can be obtained by, for example, allowing phosgene, dialkyl carbonate, diallyl carbonate, or alkylene carbonate to react in the presence or absence of a catalyst, using a low-molecular-weight polyol (to be described later) as an initiator.

The polyurethane polyol can be obtained in the form of polyester polyurethane polyol, polyether polyurethane polyol, polycarbonate polyurethane polyol, or polyester polyether polyurethane polyol, by allowing the polyester polyol, polyether polyol, and/or polycarbonate polyol obtained above to react with the above-mentioned polyisocyanate component at such a ratio that the equivalent ratio (OH/NCO) of the hydroxyl group to the isocyanate group exceeds 1.

Examples of the acrylic polyol include copolymers obtained by copolymerizing a polymerizable monomer having one or more hydroxyl groups in its molecule with another monomer copolymerizable with the polymerizable monomer. Examples of the polymerizable monomer having a hydroxyl group include 2-hydroxyethyl(meth)acrylate, hydroxypropyl(meth)acrylate, hydroxybutyl(meth)acrylate, 2,2-dihydroxymethylbutyl(meth)acrylate, polyhydroxyalkyl maleate, and polyhydroxyalkyl fumarate. Moreover, examples of such another monomer copolymerizable with these polymerizable monomers include (meth)acrylic acid, alkyl(meth)acrylate (of 1 to 12 carbon atoms), maleic acid, alkyl maleate, fumaric acid, alkyl fumarate, itaconic acid, alkyl itaconate, styrene, α-methyl styrene, vinyl acetate, (meth)acrylonitrile, 3-(2-isocyanate-2-propyl)-α-methylstyrene, trimethylolpropane tri(meth)acrylate, and pentaerythritol tetra(meth)acrylate. The acrylic polyol can be obtained by copolymerizing these monomers in the presence of a suitable solvent and a suitable polymerization initiator.

Examples of the epoxy polyol include epoxy polyols obtained by reaction of a low-molecular-weight polyol (to be described later) with a polyfunctional halohydrin such as epichlorohydrin and β-methyl epichlorohydrin.

Examples of the natural oil polyol include hydroxyl group-containing natural oil such as castor oil and coconut oil.

Examples of the silicone polyol include copolymers in which vinyl group-containing silicone compounds such as γ-methacryloxypropyltrimethoxysilane are used as another copolymerizable monomer in the copolymerization of the above acrylic polyols; and terminal alcohol-modified polydimethylsiloxane.

Examples of the fluorine polyol include copolymers in which vinyl group-containing fluorine compounds such as tetrafluoroethylene and chlorotrifluoroethylene are used as another copolymerizable monomer in the copolymerization of the above acrylic polyols.

Examples of the polyolefin polyol include polybutadiene polyol and partially saponified ethylene-vinylacetate copolymer.

The macropolyol has a hydroxyl equivalent of, for example, 200 to 5000, or preferably 250 to 4000.

The macropolyol has a number average molecular weight of, for example, 400 to 10000, or preferably 500 to 8000.

The number average molecular weight of the macropolyol can be calculated by a known hydroxyl number determination method such as acetylation or phthalation, and from the functionality of an initiator or a raw material.

The low-molecular-weight polyol is a polyol having a number average molecular weight of less than 400, and examples thereof include the above-mentioned polyhydric alcohols. Examples of the low-molecular-weight polyol include low-molecular-weight diols such as ethylene glycol, propylene glycol, 1,4-butylene glycol, 1,3-butylene glycol, 1,2-butylene glycol, 2-methyl-1,3-propanediol, 1,5-pentanediol, neopentyl glycol, 3-methyl-1,5-pentanediol, 2,4-diethyl-1,5-pentanediol, 1,6-hexanediol, alkane (of 7 to 22 carbon atoms) diol, diethylene glycol, trioxyethylene glycol, tetraoxyethylene glycol, pentaoxyethylene glycol, hexaoxyethylene glycol, dipropylene glycol, trioxypropylene glycol, tetraoxypropylene glycol, pentaoxypropylene glycol, and hexaoxypropylene glycol; and polyhydroxyalkanoic acids such as dimethylolpropionic acid.

These adhesive polyol components can be used alone or in combination of two or more kinds.

As the adhesive polyol component, combination use of a macropolyol and a low-molecular-weight polyol is preferable, or combination use of a polyester polyol, a low-molecular-weight diol, and a polyhydroxyalkanoic acid is more preferable.

The adhesive urethane prepolymer is obtained by allowing an adhesive polyisocyanate component and an adhesive polyol component to react by a known polymerization method such as bulk polymerization or solution polymerization.

In this reaction, when a polyhydroxy compound containing an anionic group such as a polyhydroxyalkanoic acid is contained in the adhesive polyol component, the aqueous polyurethane resin can be prepared in the form of an anionic internal-emulsification-type aqueous polyurethane resin.

The polyhydroxy compound containing an anionic group can be contained in the form of, for example, a polyhydric alcohol of a polyester polyol, or a low-molecular-weight polyol.

In the synthesis of the adhesive urethane prepolymer, the components are blended at such a ratio that the equivalent ratio (NCO/OH) of the isocyanate group of the adhesive polyisocyanate component to the hydroxyl group of the adhesive polyol component is, for example, from 1.1 to 2.5, preferably from 1.2 to 2.3, or more preferably from 1.2 to 2.0.

When the equivalent ratio is within this range, the dispersion stability of the adhesive urethane prepolymer can be improved.

In bulk polymerization, for example, while the adhesive polyisocyanate component is stirred under a nitrogen atmosphere, the adhesive polyol component is added thereto, and the mixture is allowed to react at a temperature of, for example, 50 to 130° C., or preferably 50 to 100° C. for 1 to 15 hours, or preferably 3 to 12 hours.

In solution polymerization, for example, the adhesive polyisocyanate component and the adhesive polyol component are added to an organic solvent under a nitrogen atmosphere, and the mixture is allowed to react at a temperature of, for example, 50 to 130° C., or preferably 50 to 80° C. for 3 to 15 hours, or preferably 5 to 12 hours.

The organic solvent is inert to an isocyanate group and has a high affinity for water, and examples thereof include ketones such as acetone and methyl ethyl ketone; esters such as ethyl acetate, butyl acetate, and isopropyl acetate; ethers such as tetrahydrofuran; nitriles such as acetonitrile; and amides such as N,N-dimethylformamide and N-methylpyrrolidone. Of these, ketones and nitriles are preferable.

In the above reaction, if necessary, a known urethanizing catalyst such as amine catalyst, tin catalyst, lead catalyst, or bismuth catalyst may be added, and an (unreacted) adhesive polyisocyanate component free from the resulting adhesive urethane prepolymer may be removed by a known removal means such as distillation or extraction.

When an anionic group is contained in the resulting adhesive urethane prepolymer, a neutralizing agent is preferably added to form a salt of the anionic group.

Examples of the neutralizing agent include amines such as trimethylamine, triethylamine, tri-n-propylamine, tributylamine, triethanolamine, tri-isopropanolamine, and N,N'-dimethylethanolamine; inorganic alkali salts such as potassium hydroxide, sodium hydroxide, and lithium hydroxide; and further, ammonia. Of these, amines and ammonia are preferable.

The neutralizing agent is added at a ratio of, for example, 0.4 to 1.2 equivalents, or preferably 0.6 to 1.0 equivalent, per 1 equivalent of the anionic group.

The isocyanate group content of the adhesive urethane prepolymer thus obtained is, for example, from 0.5 to 10% by weight, or preferably from 1 to 8% by weight.

The isocyanate group of the adhesive urethane prepolymer has an average functionality of, for example, 1.1 to 3.5, or preferably 1.5 to 2.5, and a number average molecular weight of, for example, 700 to 15000, or preferably 1000 to 8000.

The gas-barrier urethane prepolymer is an isocyanate group-terminated urethane prepolymer for imparting gas barrier properties to the polyurethane dispersion of the present invention, and can be obtained by allowing a gas-barrier polyisocyanate component and a gas-barrier polyol component to react at such a ratio that the amount of the isocyanate group of the gas-barrier polyisocyanate component exceeds that of the hydroxyl group of the gas-barrier polyol component.

Examples of the gas-barrier polyisocyanate component include the same polyisocyanate components as the above-mentioned adhesive polyisocyanate components. The gas-barrier polyisocyanate component that may be used include, for example, aromatic polyisocyanates such as MDI, TDI, TODI, and NDI; aralkyl polyisocyanates such as XDI and TMXDI; alicyclic polyisocyanates such as IPDI, $H_{12}$MDI, $H_6$XDI, and NBDI; and aliphatic polyisocyanates such as HDI.

These gas-barrier polyisocyanate components can be used alone or in combination of two or more kinds.

As the gas-barrier polyisocyanate component, an aralkyl diisocyanate and an alicyclic diisocyanate are preferable, or XDI and $H_6$XDI are more preferable.

Examples of the gas-barrier polyol component include the same polyol components as the above-mentioned adhesive polyol components. The gas-barrier polyol component that may be used include, for example, a macropolyol and a low-molecular-weight polyol.

These gas-barrier polyol components can be used alone or in combination of two or more kinds.

As the gas-barrier polyol component, a low-molecular-weight polyol is preferable, or combination use of an alkane polyol having 2 to 6 carbon atoms and/or a polyoxyalkylene glycol having 2 to 6 carbon atoms, and a polyhydroxyalkanoic acid is more preferable.

Specific examples of the alkane polyol having 2 to 6 carbon atoms include ethylene glycol, 1,2-propylene glycol, 1,3-propylene glycol, 1,4-butylene glycol, 1,3-butylene glycol, 1,2-butylene glycol, 2-methyl-1,3-propanediol, 1,5-pentanediol, neopentyl glycol, 3-methyl-1,5-pentanediol, and 1,6-hexanediol. Of these, ethylene glycol, 1,3-propylene glycol, 1,4-butylene glycol, and 1,6-hexanediol are preferable.

Examples of the polyoxyalkylene glycol having 2 to 6 carbon atoms include diethylene glycol, trioxyethylene glycol, tetraoxyethylene glycol, pentaoxyethylene glycol, hexaoxyethylene glycol, dipropylene glycol, trioxypropylene glycol, tetraoxypropylene glycol, pentaoxypropylene glycol, and hexaoxypropylene glycol. Of these, diethylene glycol, trioxyethylene glycol, dipropylene glycol, and trioxypropylene glycol are preferable.

Examples of the polyhydroxyalkanoic acid include dimethylolacetic acid, dimethylollactic acid, dimethylolpropionic acid, and dimethylolbutanoic acid. Of these, dimethylolpropionic acid is preferable.

The gas-barrier urethane prepolymer is obtained by allowing the gas-barrier polyisocyanate component and the gas-barrier polyol component to react by the same synthesizing method as the above-mentioned adhesive urethane prepolymer synthesizing method.

In this reaction, when a polyhydroxy compound containing an anionic group such as a polyhydroxyalkanoic acid is contained in the gas-barrier polyol component, the aqueous polyurethane resin can be prepared in the form of an anionic internal-emulsification-type aqueous polyurethane resin.

The polyhydroxy compound containing an anionic group can be contained in the form of, for example, a low-molecular-weight polyol.

Thus, in the same manner as for the above-mentioned adhesive urethane prepolymer, the gas-barrier urethane prepolymer can be aqueously dispersed (to be described later).

The isocyanate group content of the gas-barrier urethane prepolymer thus obtained is, for example, from 2 to 20% by weight, or preferably from 3 to 15% by weight.

The isocyanate group of the gas-barrier urethane prepolymer has an average functionality of, for example, 1.1 to 3.5, or preferably 1.5 to 2.5.

The gas-barrier urethane prepolymer has a number average molecular weight of, for example, 400 to 5000, or preferably 500 to 3000.

In order to obtain the polyurethane dispersion of the present invention, the adhesive urethane prepolymer and the gas-barrier urethane prepolymer thus obtained are aqueously dispersed and then allowed to react with a chain extender.

In this reaction, for example, the liquid mixture of the adhesive urethane prepolymer and the gas-barrier urethane prepolymer is allowed to react with a chain extender. Alternatively, for example, the adhesive urethane prepolymer is allowed to react with a chain extender, and the gas-barrier urethane prepolymer is separately allowed to react with the chain extender, and both the resulting products are then mixed.

First of all, a method of allowing the mixture of the adhesive urethane prepolymer and the gas-barrier urethane prepolymer to react with a chain extender will be described below.

In this method, the adhesive urethane prepolymer and the gas-barrier urethane prepolymer are first aqueously dispersed.

As the method of aqueously dispersing the adhesive urethane prepolymer and the gas-barrier urethane prepolymer, a method of stirring the adhesive urethane prepolymer and the gas-barrier urethane prepolymer and gradually adding water thereto; a method of stirring water and gradually adding the adhesive urethane prepolymer and the gas-barrier urethane prepolymer thereto; a method of stirring the adhesive urethane prepolymer and gradually adding the gas-barrier urethane prepolymer and water thereto; or a method of stirring the gas-barrier urethane prepolymer and gradually adding the adhesive urethane prepolymer and water thereto may be used.

Thus, an aqueous dispersion containing the adhesive urethane prepolymer and the gas-barrier urethane prepolymer is prepared. In the stirring, preferably, a homo disper or the like is used to impart high shear to the mixture.

Water is added at a ratio of, for example, 20 to 1000 parts by weight per 100 parts by weight of a total volume of the adhesive urethane prepolymer and the gas-barrier urethane prepolymer.

Next, in this method, a chain extender is blended with the aqueous dispersion containing the adhesive urethane prepolymer and the gas-barrier urethane prepolymer to allow a chain extension reaction to proceed.

According to the present invention, examples of the chain extender include low-molecular-weight polyol, low-molecular-weight polyamine, amino alcohols, hydrazine and its derivative.

Examples of the low-molecular-weight polyol include the above-mentioned low-molecular-weight polyols.

Examples of the low-molecular-weight polyamine include aromatic polyamines such as 4,4'-diphenylmethanediamine; aralkyl polyamines such as 1,3- or 1,4-xylylene diamine, or a mixture thereof; alicyclic polyamines such as 3-aminomethyl-3,5,5-trimethyl cyclohexylamine, 4,4'-dicyclohexyl methanediamine, 2,5(2,6)-bis(aminomethyl)bicyclo[2.2.1]heptane, 1,3- or 1,4-bis(aminomethyl)cyclohexane or mixtures thereof, 1,3- or 1,4-cyclohexanediamine or mixtures thereof; and aliphatic polyamines such as ethylenediamine, 1,3-propanediamine, 1,4-butanediamine, 1,6-hexamethylenediamine, diethylenetriamine, triethylenetetramine, and tetraethylenepentamine.

Examples of the amino alcohols include N-(2-aminoethyl)ethanolamine, and N-(3-aminopropyl)ethanolamine.

Examples of the hydrazine and its derivative include hydrazine (including hydrates thereof), succinic dihydrazide, and adipic dihydrazide.

These chain extenders can be used alone or in combination of two or more kinds.

As the chain extender, low-molecular-weight polyamine, amino alcohols, and hydrazine and its derivative are preferable.

Then, for the chain extension reaction, for example, a chain extender is blended with the aqueous dispersion containing the adhesive urethane prepolymer and the gas-barrier urethane prepolymer.

The chain extender is blended at such a ratio that the equivalent ratio (NCO/active hydrogen group) of the isocyanate groups of the adhesive urethane prepolymer and the gas-barrier urethane prepolymer to the active hydrogen group (a hydroxyl group and an amino group) of the chain extender is approximately 1, or preferably 0.8 to 1.2.

In the chain extension reaction, specifically, the aqueous dispersion containing the adhesive urethane prepolymer and the gas-barrier urethane prepolymer is stirred and a chain extender is added dropwise thereto. The stirring is preferably performed with a homo disper or the like so as to impart high shear to the mixture. The chain extender to be dropped may be prepared as an aqueous chain extender solution by preliminarily diluting the chain extender with water.

The chain extension reaction is performed under a normal pressure or, if necessary, under a nitrogen atmosphere, while the adhesive urethane prepolymer and the gas-barrier urethane prepolymer are allowed to react with the chain extender at a temperature of, for example, 5 to 30° C., or preferably 5 to 25° C. for 10 minutes to 5 hours, or preferably 30 minutes to 3 hours.

Such setting of the reaction conditions can suppress the reaction of the isocyanate groups of the adhesive urethane prepolymer and the gas-barrier urethane prepolymer with water.

After completion of the dropping of the chain extender, the stirring continues further to complete the reaction at room temperature, for example.

The above-mentioned reaction can produce an aqueous polyurethane resin (hereinafter referred to as an adhesive-gas barrier resin) which is obtained by allowing the adhesive urethane prepolymer and the gas-barrier urethane prepolymer to react with the chain extender. Therefore, the polyurethane dispersion of the present invention can be obtained in the form of the aqueous dispersion containing the adhesive-gas barrier resin.

According to this method, the dispersion of the adhesive-gas barrier resin can be reliably produced.

The following description will discuss a method of allowing the adhesive urethane prepolymer to react with the chain extender, separately allowing the gas-barrier urethane prepolymer to react with the chain extender, and then mixing the resulting products.

In this method, first, an aqueous dispersion containing the adhesive urethane prepolymer is prepared.

For preparation of the aqueous dispersion containing the adhesive urethane prepolymer, for example, the same preparation method as that for the above-mentioned aqueous dispersion containing the adhesive urethane prepolymer and the gas-barrier urethane prepolymer is adopted.

Subsequently, in this method, a chain extender is blended with the obtained aqueous dispersion containing the adhesive urethane prepolymer to allow a chain extension reaction to proceed in the same manner as the above-mentioned chain extension reaction.

The above-mentioned reaction can produce an aqueous polyurethane resin (hereinafter referred to as an adhesive resin) which is obtained by allowing the adhesive urethane prepolymer to react with the chain extender.

In this method, an aqueous dispersion containing the gas-barrier urethane prepolymer is separately prepared.

For preparation of the aqueous dispersion containing the gas-barrier urethane prepolymer, for example, the same preparation method as that for the above-mentioned aqueous dispersion containing the adhesive urethane prepolymer and the gas-barrier urethane prepolymer is adopted.

Subsequently, in this method, a chain extender is blended with the obtained aqueous dispersion containing the gas-barrier urethane prepolymer to allow a chain extension reaction to proceed in the same manner as the above-mentioned chain extension reaction.

The above-mentioned reaction can produce an aqueous polyurethane resin (hereinafter referred to as a gas barrier resin) which is obtained by allowing the gas-barrier urethane prepolymer to react with the chain extender.

Thereafter, in this method, an aqueous dispersion containing the obtained adhesive resin and an aqueous dispersion containing the obtained gas barrier resin are mixed with stirring. This can produce the polyurethane dispersion of the present invention in the form of an aqueous dispersion containing the adhesive resin and the gas barrier resin.

The polyurethane dispersion thus obtained has a solid content of, for example, 5 to 60% by weight, or preferably 10 to 50% by weight, and an average particle size of, for example, 10 to 500 nm, or preferably 20 to 300 nm. It also has a resin acid value of, for example, 5 to 50 mg KOH/g, or preferably 10 to 40 mg KOH/g, and a total concentration of the urethane group and the urea group of, for example, 15 to 50% by weight, or preferably 20 to 45% by weight.

In the case of using an organic solvent in the synthesis of the adhesive urethane prepolymer and the gas-barrier urethane prepolymer, the organic solvent is distilled off after completion of the synthetic reaction of the adhesive urethane prepolymer and the gas-barrier urethane prepolymer, or after completion of the chain extension reaction, for example, by heating at an appropriate temperature under a reduced pressure.

The polyurethane dispersion of the present invention may be prepared in the form of an aqueous dispersion containing the adhesive-gas barrier resin, the adhesive resin, and the gas barrier resin by appropriately using the two chain extension reactions described above in combination.

In the polyurethane dispersion of the present invention, there can be appropriately blended additives such as plasticizer, antifoamer, leveling agent, antifungal agent, anticorrosives, delustrant, fire retardant, thixotropic agent, tackifier, thickening agent, lubricant, antistatic agent, surfactant, reaction retardant, antioxidant, ultraviolet absorber, anti-hydrolysis agent, weathering stabilizer, heat-resistant stabilizer, dye, inorganic pigment, organic pigment, extender pigment, curing agent, anti-tack agent, inorganic particles, water swellable inorganic layered compounds such as montmorillonite, synthetic mica, or organic particles, as long as an advantageous effect of the present invention is not prevented. The blending ratio of such various additives is appropriately selected according to the purposes and applications.

As described above, when the polyhydroxy compound containing an anionic group is contained as the raw material component(s) of the adhesive urethane prepolymer and/or the gas-barrier urethane prepolymer, the aqueous polyurethane resin can be obtained in the form of an anionic internal-emulsification-type aqueous polyurethane resin. However, for example, a polyhydroxy compound containing a nonionic group such as polyoxyethylene glycol is contained as the raw material component thereof, which may obtain the aqueous polyurethane resin in the form of a nonionic internal-emulsification-type aqueous polyurethane resin.

Further, in the polyurethane dispersion of the present invention, at the time of aqueous dispersion of the adhesive urethane prepolymer and the gas-barrier urethane prepolymer without containing any of the polyhydroxy compound containing an anionic group and the polyhydroxy compound containing a nonionic group as the raw material component, a surfactant is blended to be forcibly emulsified, whereby the aqueous polyurethane resin can be aqueously dispersed in the form of an external-emulsification-type aqueous polyurethane resin.

The polyurethane dispersion of the present invention thus obtained has both adhesion (in particular, water resistant adhesion) and gas barrier properties, and can be used as an adhesive material such as an adhesive, a primer, and an anchor coat agent in various industrial fields. In particular, the polyurethane dispersion can be used in fields requiring adhesion and gas barrier properties, for example, in a gas-barrier laminated film. It can preferably be used as an anchor coat agent for adhesively bonding a thermoplastic resin film and an inorganic deposited film in a gas-barrier laminated film in which the thermoplastic resin film and the inorganic deposited film are laminated.

The gas-barrier laminated film has, for example, a base film, an anchor coat layer formed on a surface of the base film, and an inorganic deposited film formed on a surface of the anchor coat layer.

Examples of the base film include thermoplastic resin films formed of thermoplastic resin. Of these, a polyester film formed of polyester resin is preferable. The polyester resin is a synthetic polymer which is primarily bonded through an ester linkage and can usually be obtained by subjecting a dicarboxylic acid component and a glycol component to polycondensation reaction.

As the dicarboxylic acid component, terephthalic acid is primarily used and can be used in combination with other component including aromatic dicarboxylic acid such as orthophthalic acid, isophthalic acid, naphthalene dicarboxylic acid, diphenyldicarboxylic acid, diphenylsulfone dicarboxylic acid, diphenoxyethane dicarboxylic acid, and 5-sodium sulfoisophthalic acid; aliphatic dicarboxylic acid such as oxalic acid, succinic acid, adipic acid, sebacic acid, dimer acid, maleic acid, and fumaric acid; alicyclic dicarboxylic acid such as cyclohexynedicarboxylic acid; or oxycarboxylic acid such as p-oxybenzoic acid.

As the glycol component, ethanediol is primarily used and can be used in combination with other component including aliphatic glycol such as propanediol, butanediol, pentanediol, hexanediol, and neopentyl glycol; alicyclic glycol such as cyclohexane dimethanol; or aromatic glycol such as bisphenol A and bisphenol S. Further, polyether polyol such as polyethylene glycol or polytetramethylene glycol can also be used in combination.

The dicarboxylic acid component and the glycol component are subjected to polycondensation reaction, for example, at high temperature under a reduced pressure, to thereby produce a polyester resin. In this reaction, a polymerization catalyst and a coloring inhibitor can be added.

Examples of the polymerization catalyst include alkali metal compound, alkaline earth metal compound, zinc compound, lead compound, manganese compound, cobalt compound, aluminum compound, germanium compound, antimony compound, and titanium compound. Of these, germanium compound, antimony compound, and titanium compound are preferable.

Examples of the coloring inhibitor include phosphorus compounds.

Further, in this reaction, after the polycondensation reaction, for example, the intrinsic viscosity and the carboxyl terminal group content of the polyester resin can also be adjusted at a melting point of the polyester resin or lower under a reduced pressure or in an inert gas atmosphere.

In the polyester resin, particles are preferably contained from the viewpoint of processability such as lamination or printing, and handleability.

Known particles blended with a polyester film may be used as the particles and examples thereof include inorganic particles and organic particles.

As for the inorganic particles, for example, particles made of wet or dry silica, colloidal silica, aluminum silicate, titanium oxide, calcium carbonate, calcium phosphate, barium sulfate, aluminum oxide, mica, kaolin, clay, or the like may be used.

As for the organic particles, for example, particles made of polystyrene, organic silicone, polyacrylic acids, polymethacrylic acids, polyesters, polymers of divinyl compounds, or the like may be used.

These particles can be used alone or in combination of two or more kinds.

As the particles, inorganic particles such as wet or dry silica and alumina, or organic particles such as polystyrene, organic silicone, polyacrylic acid, polymethacrylic acid, polyester, and divinylbenzene polymer are preferable.

In the polyester resin, particles are contained in an amount of, for example, 0.01 to 3% by weight, or preferably 0.03 to 3% by weight, and has an average particle size of, for example, 0.01 to 5 μm.

The particles are prepared, for example, as a masterbatch of the polyester resin to be blended therewith and are then mixed with the polyester resin.

Additives such as antistatic agent, heat stabilizer, antioxidant, crystal nucleating agent, weathering agent, ultraviolet absorber, pigment, and dye may be appropriately contained in the polyester resin.

As the polyester resin, commercially available polyethylene terephthalate resin may be used as is.

The polyester film can be shaped in the following procedure: For example, a polyester resin is formed into a chip shape and then melt-kneaded with an extruder or the like. The kneaded resin is extruded into a sheet-like shape with a T die. Subsequently, the extruded resin is firmly adhered to a cooling roller and then solidified, so that the resin can be shaped into the form of a cast film (an unoriented film or an unstretched film). In order to improve the adhesion between the melted sheet and the cooling roller, preferably, an electrostatic adhesion method and/or a liquid coating adhesion method is/are adopted.

In this shaping, the polyester film can also be shaped, for example, by co-extrusion in the form of a laminated film made of two or more kinds of polyester resins.

Thereafter, the polyester film is uniaxially or biaxially stretched depending on the purpose. Preferably, the polyester film is biaxially stretched.

For uniaxial stretching, the polyester film is stretched 2.3 to 7 times longer in an MD direction with rolls heated at a temperature higher than the glass transition temperature of the polyester resin, for example, at 40 to 130° C. Thus, a uniaxially oriented film (uniaxially stretched film) is obtained.

For biaxial stretching, after uniaxial stretching, the polyester film is stretched 3 to 7 times wider in a TD direction at 45 to 130° C., for example. Alternatively, simultaneous biaxial stretching is performed so that the area ratio of the polyester film (cast film) is, for example, 6 to 30 times. It should be noted that the area ratio thereof is calculated by multiplying an MD stretching ratio by a TD stretching ratio.

The stretching may be carried out through multi-steps. In such case, the polyester film is stretched so that the final stretching ratio is within the above range.

Thus, a biaxially oriented film (biaxially stretched film) is obtained.

Further, the polyester film thus obtained may subsequently be subjected to heat treatment in line and/or off line. In such case, if necessary, the polyester film may be stretched again in the MD and/or TD direction(s) before and after the heat treatment. The heat treatment temperature is, for example, from 150 to 250° C., or preferably from 200 to 240° C., and the heat treatment time is usually for 1 second to 5 minutes, or preferably for 1 second to 300 seconds. Thus, the heat treatment can adjust the heat shrinkage characteristics of the polyester film.

The cooling rate of the polyester film after the heat treatment also has an influence on the heat shrinkage characteristics. For example, after the heat treatment, by cooling the polyester film quickly or slowly, or by providing an intermediate cooling zone, the heat shrinkage stress can be adjusted. In order to impart, in particular, specific heat shrinkage characteristics, the polyester film can be relaxed in the MD and/or TD direction(s) during the heat treatment or in the subsequent slow cooling zone.

Of the polyester film thus obtained, the surface on which the anchor coat layer is formed has a surface free energy of preferably 45 to 60 mN/m, and the surface not having the anchor coat layer formed thereon has also a surface free energy of preferably 45 to 60 mN/m in terms of adhesion to other packaging material, ease of printing or inorganic deposited film formation, or the like.

In order to set the surface free energy within the above range, there may be used, for example, a method of treating the surface of the polyester film by corona discharge or by a flame in an inert gas atmosphere or in the air.

The anchor coat layer is formed by laminating the above-mentioned anchor coat agent on a surface of the base film.

As the method of laminating the anchor coat layer, for example, a hot melt coating method, an in-line coating method, or an off-line coating method may be used. An in-line coating method is preferably used. The in-line coating method can improve adhesion to an inorganic deposited film, glossiness of a coating film, and adhesion to printing ink.

A known in-line coating method may be used and is preferably carried out in the polyester film stretching step. For example, before completion of crystal orientation of the polyester resin, an anchor coat agent is applied to a surface of the polyester film, and the anchor coat agent is then dried. Therefore, the polyester film is stretched, and heat-treated to complete the orientation crystallization of the polyester film. This can prevent a pinhole from generating in the inorganic deposited film due to adhering of impurities during the in-line coating step, and also can form a uniformly thin anchor coat layer.

Specifically, a polyester film (cast film) is uniaxially stretched, an anchor coat layer is then formed on a surface of the uniaxially stretched film by the in-line coating method, and thereafter biaxial stretching is carried out. In the case of simultaneous biaxial stretching, an anchor coat layer is formed on a surface of the uniaxially stretched film by the in-line coating method prior to the simultaneous biaxial stretching.

A known off-line coating method may be used to laminate an anchor coat layer and is carried out after completion of the polyester film stretching step.

In the in-line coating method or the off-line coating method, the polyester resin is preferably prepared as a watersoluble and/or a water dispersible resin, in terms of explosion proof properties of the apparatus or environmental pollution.

The thickness of the anchor coat layer is not particularly limited and is, for example, 0.001 μm or more and 1 μm or less, preferably 0.005 μm or more and 0.3 μm or less, more preferably 0.01 μm or more and 0.1 μm or less, or even more preferably 0.02 μm or more and 0.07 μm or less.

When the anchor coat layer is thicker than the above range, the inorganic deposited film may be whitened with heat at approximately 200° C., resulting in deterioration of gloss. On the other hand, when thinner than the above range, the adhesion between the inorganic deposited film and the anchor coat layer may deteriorate. Further, the anchor coat layer having a thickness within the above range can improve recoverability when a barrier laminated film is formed again into a chip shape.

The inorganic deposited film is a thin film of an inorganic material. Examples of the inorganic material include inorganic substances containing metals of group 2 of the periodic table such as magnesium, calcium, and barium, metals of group 4 of the periodic table such as titanium and zirconium, metals of group 13 of the periodic table such as aluminum and indium, and metals of group 14 of the periodic table such as silicon, germanium, and tin; inorganic oxides containing metal oxides such as magnesium oxide, titanium oxide, aluminum oxide, indium oxide, silicon oxide, and tin oxide; and inorganic nitrogen oxides such as oxidation silicon nitride. Of these, aluminum, silicon, and oxides thereof are preferable, from the viewpoints of gas barrier properties and production efficiency. A plurality of these metals and oxides thereof may be combined to form a layer made of metal and/or metal oxide.

The inorganic deposited film is formed on the surface of the anchor coat layer by, for example, a vacuum vapor deposition method, an EB deposition method, a sputtering method, an ion plating method, a lamination method, or a plasma chemical vapor deposition method (CVD method). Of these, a vacuum vapor deposition method is preferable from the viewpoint of productivity. In the vacuum vapor deposition method, an electron beam heating system, a resistance heating system, and an induction heating system are preferably adopted as a heating system of a vacuum evaporator.

The thickness of the inorganic deposited film is appropriately selected depending on the kind and component of the inorganic material, and is usually from 1 to 500, preferably from 2 to 300 nm, more preferably from 3 to 100 nm, or even more preferably 5 to 50 nm. When the inorganic deposited film is thicker than the above range, its flexibility deteriorates, which may cause a crack or a pinhole in the inorganic deposited film during processing such as bending or pulling after deposition, whereby the gas barrier properties may be impaired. In addition, the inorganic deposited film may have deteriorated transparency or may be colored, and further productivity may be degraded. On the other hand, when it is thinner than the above range, the inorganic deposited film has excellent transparency but it is difficult to obtain a uniform thin film, and the thickness is not afforded, so that its gas barrier properties may be insufficient.

The inorganic deposited film can be formed by laminating two or more kinds of inorganic materials. Examples of the laminating method include a vacuum vapor deposition method, an EB deposition method, a sputtering method, an ion plating method, and a lamination method. Of these, a vacuum vapor deposition method is preferable from the viewpoint of lamination thickness.

EXAMPLES

While in the following, the present invention will be described in further detail with reference to Examples and Comparative Examples, the present invention is not limited to any of them.

1) Synthesis of Adhesive Urethane Prepolymer

Synthesis Example 1

A four-neck flask equipped with an agitator, a thermometer, a reflux tube, and a nitrogen introducing tube was charged with 190.7 parts by weight of ester A, 3.4 parts by weight of diethylene glycol, 21.3 parts by weight of dimethylolpropionic acid, and 175.0 parts by weight of methyl ethyl ketone, and the charged components were mixed.

Next, 93.4 parts by weight of 4,4'-dicyclohexylmethane diisocyanate and 0.04 parts by weight of Stanoct were added into the four-neck flask, and the mixture was allowed to react at 75° C. for 6 hours to thereby produce an isocyanate group-terminated urethane prepolymer (NCO group content of 1.77% by weight).

Thereafter, the reaction solution of the urethane prepolymer thus obtained was cooled to 30° C., and 16.1 parts by weight of triethylamine was added thereto to neutralize the solution, so that an adhesive urethane prepolymer was obtained.

Synthesis Examples 2 to 5

The same procedures as in Synthesis Example 1 were carried out except that the reaction was performed according to the blending formulation shown in TABLE 1, so that adhesive urethane prepolymers of Synthesis Examples 2 to 5 were prepared. It should be noted that the reaction was performed at a reaction temperature of 75° C. in Synthesis Example 2 and at 70° C. in Synthesis Examples 3 to 5.

The blending formulations of Synthesis Examples 1 to 5 are shown in TABLE 1.

2) Preparation of Gas-Barrier Urethane Prepolymer

Synthesis Example 6

A four-neck flask equipped with an agitator, a thermometer, a reflux tube, and a nitrogen introducing tube was charged with 46.7 parts by weight of ethylene glycol, 20.7 parts by weight of dimethylolpropionic acid, and 175.0 parts by weight of methyl ethyl ketone, and the charged components were mixed.

Next, 159.6 parts by weight of 1,3-xylylene diisocyanate and 82.3 parts by weight of 1,3-bis(isocyanatomethyl)cyclohexane were added into the four-neck flask, and the mixture was allowed to react at 70° C. for 6 hours to thereby produce an isocyanate group-terminated urethane prepolymer (NCO group content of 6.3% by weight).

Thereafter, the reaction solution of the urethane prepolymer thus obtained was cooled to 30° C., and 15.6 parts by weight of triethylamine was added thereto to neutralize the solution, so that a gas-barrier urethane prepolymer was obtained.

Synthesis Example 7

The same procedures as in Synthesis Example 6 were carried out except that the reaction was performed according to the blending formulation shown in TABLE 1, so that a gas-barrier urethane prepolymer of Synthesis Example 7 was prepared. It should be noted that the reaction temperature was 65° C.

The blending formulations of Synthesis Examples 6 and 7 are also shown in TABLE 1.

prepolymer obtained in Synthesis Example 6, and the mixture was stirred for 5 minutes with a homo disper (manufactured by PRIMIX Corporation) and aqueously dispersed.

Next, 29.9 parts by weight of N-(2-aminoethyl)ethanolamine was added thereto and the mixture was then subjected to

TABLE 1

| | | | Adhesive Urethane Prepolymer | | | | | Gas-Barrier Urethane Prepolymer | |
|---|---|---|---|---|---|---|---|---|---|
| | | | Synthesis Example 1 | Synthesis Example 2 | Synthesis Example 3 | Synthesis Example 4 | Synthesis Example 5 | Synthesis Example 6 | Synthesis Example 7 |
| Blending Formulation (w/t part) | Polyisocyanate Component | $H_{12}$MDI | 93.40 | — | — | — | — | — | — |
| | | $H_6$XDI | — | — | 79.10 | 101.40 | 114.40 | 82.30 | — |
| | | IPDI | — | 58.20 | — | — | — | — | — |
| | | XDI | — | 24.60 | — | — | — | 159.60 | 237.40 |
| | Polyol Component | Ester A | 190.70 | — | — | — | — | — | — |
| | | Ester B | — | 200.30 | — | — | — | — | — |
| | | Ester C | — | — | 207.80 | — | — | — | — |
| | | PTG2000 | — | — | — | 169.50 | — | — | — |
| | | PC2000 | — | — | — | — | 157.20 | — | — |
| | | EG | — | — | — | — | — | 46.70 | 39.10 |
| | | DEG | 3.40 | — | — | — | — | — | 12.40 |
| | | NPG | — | 4.20 | 8.70 | 14.10 | 16.40 | — | — |
| | | DMPA | 21.30 | 21.50 | 16.70 | 22.80 | 21.10 | 20.70 | 20.60 |
| | Neutralizing Agent | TEA | 16.10 | 16.20 | 12.60 | 17.20 | 15.90 | 15.60 | 15.50 |
| | Organic Solvent | MEK | 175.00 | 175.00 | 175.00 | 175.00 | 175.00 | 175.00 | 175.00 |
| | Reaction Catalyst | Stanoct | 0.04 | 0.04 | — | — | — | — | — |
| NCO Group Content (wt %) | | | 1.77 | 1.95 | 2.01 | 2.60 | 3.41 | 6.30 | 6.25 |

The abbreviations and the trade names in TABLE 1 are shown below.

$H_{12}$MDI: 4,4'-Dicyclohexylmethane diisocyanate $H_6$XDI: 1,3-Bis(isocyanatomethyl)cyclohexane (hydrogenated xylylene diisocyanate)

IPDI: 3-Isocyanatomethyl-3,5,5-trimethyl cyclohexyl isocyanate (isophorone diisocyanate)

XDI: 1,3-Xylylene diisocyanate

Ester A: Polyester polyol ((Terephthalic acid/isophthalic acid/adipic acid=1/1/1 (molar ratio))/(ethylene glycol/neopentyl glycol=1/1 (molar ratio))), number average molecular weight: 3000)

Ester B: Polyester polyol (Isophthalic acid/sebacic acid=1/1 (molar ratio))/(ethylene glycol/neopentyl glycol=1/3 (molar ratio)), number average molecular weight: 2500)

Ester C: Polyester polyol (Adipic acid/(neopentyl glycol/1,6-hexanediol=2/1 (molar ratio)), number average molecular weight: 2000)

PTG2000: Polytetramethylene ether glycol (number average molecular weight: 2000)

PC2000: Polycarbonate glycol (number average molecular weight: 2000)

EG: Ethylene glycol
DEG: Diethylene glycol
NPG: Neopentyl glycol
DMPA: Dimethylolpropionic acid
TEA: Triethylamine
MET: Methyl ethyl ketone
Stanoct: Tin octylate In TABLE 1, the NCO group content was determined according to JISK1556 (2006).

3) Preparation of Polyurethane Dispersion

Preparation Example 1

Aqueous Dispersion of Gas Barrier Resin

With 700 parts by weight of ion exchange water was blended 415.6 parts by weight of the gas-barrier urethane chain extension reaction. Subsequently, methyl ethyl ketone was distilled off to thereby prepare a polyurethane dispersion as an aqueous dispersion of a gas barrier resin (having a pH 8.2, a solid content of 30% by weight, an average particle size of 65 nm, a total concentration of the urethane group and the urea group of 40.8% by weight, and a resin acid value of 24.0 mg KOH/g).

Preparation Example 2

Aqueous Dispersion of Adhesive Resin

With 700 parts by weight of ion exchange water was blended 447.7 parts by weight of the adhesive urethane prepolymer obtained in Synthesis Example 1, and the mixture was stirred for 5 minutes with a homo disper and aqueously dispersed.

Next, 9.0 parts by weight of N-(2-aminoethyl)ethanolamine was added thereto and the mixture was then subjected to chain extension reaction. Subsequently, methyl ethyl ketone was distilled off to thereby prepare a polyurethane dispersion as an aqueous dispersion of an adhesive resin (having a pH 7.8, a solid content of 30% by weight, an average particle size of 30 nm, a total concentration of the urethane group and the urea group of 12.3% by weight, and a resin acid value of 26.6 mg KOH/g).

It should be noted that the solid content of the polyurethane dispersion obtained in Preparation Example 2 contained 56.9% by weight of a macropolyol component.

Preparation Example 3

Aqueous Dispersion of Adhesive-Gas Barrier Resin

With 700 parts by weight of ion exchange water were blended 149.2 parts by weight of the adhesive urethane prepolymer obtained in Synthesis Example 1 and 277.0 parts by weight of the gas-barrier urethane prepolymer obtained in Synthesis Example 6, and the mixture was stirred for 5 minutes with a homo disper and aqueously dispersed.

Next, 22.9 parts by weight of N-(2-aminoethyl)ethanolamine was added thereto and the mixture was then subjected to chain extension reaction. Subsequently, methyl ethyl ketone was distilled off to thereby prepare a polyurethane dispersion as an aqueous dispersion of an adhesive-gas barrier resin (having a pH 7.8, a solid content of 30% by weight, an average particle size of 80 nm, a total concentration of the urethane group and the urea group of 31.3% by weight, and a resin acid value of 24.9 mg KOH/g).

It should be noted that the solid content of the polyurethane dispersion obtained in Preparation Example 3 contained 19.0% by weight of a macropolyol component.

Preparation Examples 4 to 7

Aqueous Dispersions of Adhesive-Gas Barrier Resins

The same procedures as in Preparation Example 3 were carried out except that the reaction was performed according to the blending formulation shown in TABLE 2, so that polyurethane dispersions of Preparation Examples 4 to 7 were prepared.

The blending formulations of Preparation Examples 1 to 7 are shown in TABLE 2.

TABLE 2

| | | | Preparation Example 1 | Preparation Example 2 | Preparation Example 3 | Preparation Example 4 | Preparation Example 5 | Preparation Example 6 | Preparation Example 7 |
|---|---|---|---|---|---|---|---|---|---|
| Blending Formulation (w/t part) | Adhesive Urethane Prepolymer | Synthesis Example 1 | — | 447.7 | 149.2 | — | — | — | — |
| | | Synthesis Example 2 | — | — | — | 90.5 | — | — | — |
| | | Synthesis Example 3 | — | — | — | — | 74.3 | — | — |
| | | Synthesis Example 4 | — | — | — | — | — | 224.9 | — |
| | | Synthesis Example 5 | — | — | — | — | — | — | 148.7 |
| | Gas-Barrier Urethane Prepolymer | Synthesis Example 6 | 415.6 | — | 277.0 | — | 346.3 | — | 289.2 |
| | | Synthesis Example 7 | — | — | — | 347.2 | — | 217.0 | — |
| | N-(2-aminoethyl)ethanolamine | | 29.9 | 9.0 | 22.9 | — | 26.6 | — | — |
| | Ethylenediamine | | — | — | — | 15.5 | — | 12.8 | 15.3 |
| Aqueous Polyurethane Resin | | | Gas Barrier Resin | Adhesive Resin | | Adhesive-Gas Barrier Resin | | | |
| Resin Acid Value (mg KOH/g) | | | 24.0 | 26.6 | 24.9 | 25.3 | 23.5 | 26.7 | 25.5 |
| Urethane Group and Urea Group Concentrations (wt %) | | | 40.8 | 12.3 | 31.3 | 36.6 | 36.3 | 30.2 | 35.1 |
| Average Particle Size (nm) | | | 65.0 | 30.0 | 80.0 | 90.0 | 100.0 | 70.0 | 65.0 |
| Solid Content Concentration (wt %) | | | 30.0 | 30.0 | 30.0 | 30.0 | 30.0 | 30.0 | 30.0 |
| Content of Macropolyol Component (wt %) | | | 0.0 | 56.9 | 19.0 | 12.1 | 10.3 | 25.4 | 15.6 |

*Macropolyol: Polyester polyol, polytetramethylene ether glycol, and polycarbonate diol.

4) Preparation of Anchor Coat Agent

Example 1

The polyurethane dispersions of Preparation Examples 1 and 2 were blended so that the weight ratio of the solid content of the polyurethane dispersion of Preparation Example 1 to the solid content of the polyurethane dispersion of Preparation Example 2 was 3. Then, the mixture was blended with ion exchange water so that the solid content of an aqueous polyurethane resin was 5% by weight, to thereby prepare an anchor coat agent (AC1).

Examples 2 to 6 and Comparative Examples 1 and 2

The same procedures as in Example 1 were carried out except that the anchor coat agent was prepared according to the blending formulation shown in TABLE 3, so that anchor coat agents of Examples 2 to 6 and Comparative Examples 1 and 2 were prepared.

The blending formulations of Examples 1 to 6 and Comparative Examples 1 and 2 are shown in TABLE 3.

average particle size of 2.4 μm was added after the transesterification reaction and a polycondensation reaction was performed, so that a particle masterbatch having a particle concentration of 2% by mass was obtained.

(c) Production of Deposited PET Film

The polyethylene terephthalate resin and the particle masterbatch were mixed at a mass ratio of 98:2 and the mixture was dried in vacuo. Thereafter, the dried mixture was supplied into an extruder, melt extruded at 280° C., and then filtered with an 8-μm cut-off stainless steel fiber sintered filter (FSS). The resulting product was extruded into a sheet-like shape from a T-shaped nozzle, and the extruded sheet was cooled to be solidified on a cooling drum having a surface temperature of 25° C. by an electrostatic adhesion method.

The unstretched (unoriented) PET film thus obtained was heated at 105° C. for 2 seconds, and then stretched 4.1 times longer in the MD direction at 115° C. to produce a uniaxially-oriented film.

One surface of the uniaxially-oriented film was subjected to corona discharge treatment in the air. In order to form an anchor coat layer, the various anchor coat agents obtained in

TABLE 3

| | | Ex 1 | Ex 2 | Ex 3 | Ex 4 | Ex 5 | Ex 6 | Comp. Ex 1 | Comp. Ex 2 |
|---|---|---|---|---|---|---|---|---|---|
| Polyurethane Dispersion | | Preparation Example 1/ Preparation Example 2 = 3/1 | Preparation Example 3 | Preparation Example 4 | Preparation Example 5 | Preparation Example 6 | Preparation Example 7 | Preparation Example 1 | Preparation Example 2 |
| Solid content (wt %) | | 5.0 | 5.0 | 5.0 | 5.0 | 5.0 | 5.0 | 5.0 | 5.0 |
| Content of Polyester Componenet (wt %) | | 14.2 | 19.0 | 12.1 | 10.3 | 25.4 | 15.6 | 0.0 | 56.9 |
| | | PES1 | PES2 | PES3 | PES4 | PES5 | PES6 | PES7 | PES8 |
| Evaluation | Oxygen Permeability (ml/m² · day · Mpa) | 8.0 | 2.0 | 2.0 | 8.1 | 40.0 | 30.0 | 2.0 | 100.0 |
| | Water Vapor Permeability (g/m² · day) | 1.0 | 0.2 | 0.2 | 1.0 | 4.0 | 3.0 | 0.2 | 7.0 |
| | Adhesion (N15 mm) | 4.0 | 4.0 | 4.0 | 4.0 | 4.0 | 4.0 | 4.0 | 4.0 |
| | Water Resistant Adhesion (N/15 mm) | 3.0 | 4.0 | 4.0 | 4.0 | 4.0 | 4.0 | 0.1 | 4.0 |

5) Production of Polyester Film (a) Polyester Resin

To a mixture of 100 parts by weight of dimethyl terephthalate and 61 parts by weight of ethylene glycol were added 0.04 parts by weight of magnesium acetate and 0.02 parts by weight of antimony trioxide. The temperature was gradually increased to finally 220° C., and a transesterification reaction was then performed while methanol was distilled.

Next, 0.020 parts by weight of a 85% phosphoric acid aqueous solution was added to the transesterification product thus obtained, and then the added mixture was transferred to a polycondensation reactor. Further, the reaction system was gradually decompressed while the temperature was increased by heating, and a polycondensation reaction was performed by a conventional method at 290° C. under a reduced pressure of 1 hPa, to thereby produce a polyethylene terephthalate resin. The polyethylene terephthalate resin, in which 95% by mol or more of the acid component was terephthalic acid and 95% by mol or more of the glycol component was ethanediol, contained diethylene glycol in an amount of 1.2% by weight and had an intrinsic viscosity of 0.65.

(b) Particle Masterbatch

When a polyester was produced in the above step (a), an ethylene glycol slurry of aggregated silica particles having an the above step 4) were applied to the electrodischarge treated side with a rod coater. The coating thickness was set to be 0.05 μm after completion of the orientation crystallization of the polyester film, i.e., after heat treatment.

The uniaxially-oriented film was preheated at 105° C. for 2 seconds and then stretched 3.1 times wider in the TD direction with heating at 115° C. Next, this film was introduced into hot air of 233° C. and heat-treated for 2 seconds without relaxing in the MD and TD directions. Thereafter, the film was subjected to relaxation treatment by 2.4% relative to the film width after the stretching in the TD direction, in the width direction at 170° C., and then cooled.

The film was finally cooled to room temperature, and thereafter, the surface opposite the anchor coat layer was subjected to corona discharge treatment with a treatment strength of 20 W·min/m². This was then led to a winder and wound up to be a mill roll. Thus, a 12-μm-thick polyester film on which the anchor coat layer having a coated layer thickness of 0.05 μm was provided was finally obtained.

Next, aluminum oxide was deposited on the anchor coat layer side of the polyester film using a continuous type vacuum vapor deposition device so as to have a deposited layer thickness of 15 nm, so that deposited polyester films PES1 to PES8 were obtained.

The anchor coat agents obtained in Examples 1 to 6 in the above-mentioned step 4) were used as the anchor coat agents in PES1 to 6, respectively. The anchor coat agents obtained in Comparative Examples 1 and 2 in the above-mentioned step 4) were used as the anchor coat agents in PES 7 and 8, respectively.

6) Evaluation (a) Measurement of Oxygen Permeability

The oxygen permeability at 23° C. and 0% RH of the deposited polyester film of each of PES1 to PES8 was measured according to B method (equal pressure method) of JISK7126 (2000) using an oxygen permeability measuring device (OX-TRAN, manufactured by MOCON). The oxygen permeability was measured twice and an average of these two measured values was determined as an oxygen permeability value of PES1 to PES8.

(b) Measurement of Water Vapor Permeability

The water vapor permeability at 40° C. and 90% RH of the deposited polyester film of each of PES1 to PES8 was measured according to B method (infrared detection sensor method) of JISK7129 (2000) using a water vapor permeability measuring device (PERMATRAN, manufactured by MOCON). The water vapor permeability was measured twice and an average of these two measured values was determined as a water vapor permeability value of PES1 to 8.

(c) Measurement of Adhesion

An unstretched polypropylene film (CPP, T3501, 50 μm in thickness, manufactured by Toray Plastic Films Co., Ltd.) was adhered to the deposited layer side of the deposited polyester film of each of PES1 to PES8, using a polyurethane adhesive (A-310/A-3=10 parts by weight/1 part by weight, 12 parts by weight of ethyl acetate as a solvent, manufactured by Mitsui Chemicals Polyurethanes, Inc.).

Next, the adhered film was allowed to stand at 40° C. for 72 hours and then cut into a strip having a length of 150 mm and a width of 15 mm. CPP and the deposited film were grasped so as to be in a state where the deposited polyester film and CPP were bent at 90 degrees.

Thereafter, a dry 90° peel test at 25° C. and 50% RH was carried out at a peel rate of 300 mm/min using a Instron type tensile strength testing machine (tensilon UCT-100, manufactured by ORIENTEC Co., Ltd.) to measure the peel strength. In the measurement of the adhesion, an average of the strengths of measured length between 50 mm and 100 mm was determined as adhesion strength (adhesion). The results are also shown in TABLE 3.

(d) Measurement of Water Resistant Adhesion

An unstretched polypropylene film (CPP, T3501, 50 μm in thickness, manufactured by Toray Plastic Films Co., Ltd.) was adhered to the deposited layer side of the deposited polyester film of each of PES1 to PES8, using a polyurethane adhesive (A-310/A-3=10 parts by weight/1 part by weight, 12 parts by weight of ethyl acetate as a solvent, manufactured by Mitsui Chemicals Polyurethanes, Inc.).

Next, the adhered film was allowed to stand at 40° C. for 72 hours and then cut into a strip having a length of 150 mm and a width of 15 mm. CPP and the deposited film were grasped so as to be in a state where the deposited polyester film and CPP were bent at 90 degrees.

Thereafter, a peeling end was wet with water droplets, and a wet 90° peel test at 25° C. and 50% RH was carried out at a peel rate of 300 mm/min using an Instron type tensile strength testing machine (tensilon UCT-100, manufactured by ORIENTEC Co., Ltd.) to measure the peel strength. In the measurement of the water resistant adhesion, an average of the strengths of measured length between 50 mm and 100 mm was determined as adhesion strength (water resistant adhesion). The results are also shown in TABLE 3.

While the illustrative embodiments of the present invention are provided in the above description, such is for illustrative purpose only and it is not to be construed restrictively. Modification and variation of the present invention that will be obvious to those skilled in the art is to be covered by the following claims.

INDUSTRIAL APPLICABILITY

The polyurethane dispersion of the present invention can be used as an adhesive material such as an adhesive, a primer, and an anchor coat agent.

The invention claimed is:

1. A polyurethane dispersion obtained by aqueously dispersing an aqueous polyurethane resin obtained by reaction of an isocyanate group-terminated urethane prepolymer with a chain extender,
  wherein the isocyanate group-terminated urethane prepolymer comprises an adhesive urethane prepolymer for imparting adhesion and a gas-barrier urethane prepolymer for imparting gas barrier properties,
  the adhesive urethane prepolymer is obtained by reaction of a polyisocyanate component and a polyol component comprising a high-molecular-weight polyol having a number average molecular weight of 400 to 10000, and
  the gas-barrier urethane prepolymer is obtained by reaction of a polyisocyanate component and a polyol component not comprising the high-molecular-weight polyol but comprising a low-molecular-weight polyol having a number average molecular weight of less than 400 and being selected from an alkane polyol having 2 to 6 carbon atoms and/or a polyoxyalkylene glycol having 2 to 6 carbon atoms,
  wherein the polyurethane dispersion has a solid content of 5% to 50% by weight.

2. The polyurethane dispersion according to claim 1, wherein the aqueous polyurethane resin comprises an adhesive-gas barrier resin obtained by reaction of a mixture of the adhesive urethane prepolymer and the gas-barrier urethane prepolymer with a chain extender.

3. The polyurethane dispersion according to claim 1, wherein the aqueous polyurethane resin comprises an adhesive resin obtained by reaction of the adhesive urethane prepolymer with the chain extender; and a gas barrier resin obtained by reaction of the gas-barrier urethane prepolymer with the chain extender.

4. The polyurethane dispersion according to claim 1, wherein the polyol component for obtaining the adhesive urethane prepolymer comprises a polyester polyol and a polyhydroxyalkanoic acid, wherein the polyhydroxyalkanoic acid is a polyhydroxy compound containing a carboxyl group.

5. The polyurethane dispersion according to claim 1, wherein the polyol component for obtaining the gas-barrier urethane prepolymer consists of a low-molecular-weight polyol comprising a polyhydroxyalkanoic acid, wherein the polyhydroxyalkanoic acid is a polyhydroxy compound containing a carboxyl group.

6. The polyurethane dispersion according to claim 4, wherein the polyester polyol has a ring structure in its molecule.

7. The polyurethane dispersion according to claim 4, wherein
  the polyester polyol is obtained by reaction of a polybasic acid and a polyhydric alcohol, and the polybasic acid is at least one polybasic acid selected from the group consisting of terephthalic acid, isophthalic acid, and orthophthalic acid.

8. The polyurethane dispersion according to claim 5, wherein the polyisocyanate component comprises an aralkyl diisocyanate and/or an alicyclic diisocyanate.

9. The polyurethane dispersion according to claim 8, wherein the polyisocyanate component comprises xylylene diisocyanate and/or hydrogenated xylylene diisocyanate.

10. A method comprising
anchor-coating at least one side of a thermoplastic resin film with the polyurethane dispersion according to claim 1, and
laminating and adhesively bonding an inorganic deposited film on the at least one side of a thermoplastic resin film.

11. The method according to claim 10, wherein the thermoplastic resin film is a polyester film.

12. A method for producing a polyurethane dispersion comprising the steps of:
allowing a polyisocyanate component and a polyol component comprising a high-molecular-weight polyol having a number average molecular weight of 400 to 10000 to react to thereby prepare an adhesive urethane prepolymer having an isocyanate group in its molecular terminal, for imparting adhesion;
allowing a polyisocyanate component and a polyol component not comprising a high-molecular-weight polyol but comprising a low-molecular-weight polyol having a number average molecular weight of less than 400 selected from an alkane polyol having 2 to 6 carbon atoms and/or a polyoxyalkylene glycol having 2 to 6 carbon atoms to react to thereby prepare a gas-barrier urethane prepolymer having an isocyanate group in its molecular terminal, for imparting gas barrier properties; and
allowing a mixture of the adhesive urethane prepolymer and the gas-barrier urethane prepolymer to react with a chain extender in water to thereby obtain a dispersion of an adhesive-gas barrier resin
wherein the polyurethane dispersion has a solid content of 5% to 50% by weight.

* * * * *